United States Patent Office 3,313,774
Patented Apr. 11, 1967

3,313,774
COMPOSITIONS OF PHOSPHONITRILIC HALIDE-POLYHYDRIC PHENOL COPOLYMERS WITH CROSSLINKING AGENTS
Rip G. Rice, San Diego, and Philip D. Faurote and Buell H. Geib, Canoga Park, Calif., assignors to General Dynamics Corporation, San Diego, Calif., a corporation of Delaware
No Drawing. Filed Sept. 4, 1962, Ser. No. 221,935
4 Claims. (Cl. 260—47)

This invention relates to the production of novel polymeric substances formed from condensation products of phosphonitrilic halides, preferably the chlorides, and polyhydroxy aromatic compounds, preferably benzenediols, and is particularly concerned with products obtained by and procedure for reacting such condensation products with substances having functional characteristics such as to cross-link said condensation products to form polymeric substances having a variety of important uses.

The production of a novel class of condensation products of cyclic phosphonitrilic halides, particularly the chloride, with polyhydroxy aromatic compounds such as hydroquinone, is described in the copending applications of Rice and Riley, Ser. No. 205,222, filed June 26, 1962, and Ser. No. 31,814, filed May 26, 1960, and Rice and Riley, Ser. No. 820,574, filed June 16, 1959, now abandoned.

It is an object of this invention to produce novel polymeric materials based on the aforementioned condensation products of cyclic phosphonitrilic chlorides and polyhydroxy aromatic compounds.

Another object is the provision of polymeric materials formed by reaction of such condensation products with certain classes of reactants to produce substances which are useful, e.g. as coatings, as adhesives, as bonding materials for laminated structures, and for production of moldings.

Another object is the provision of polymeric products produced by cross-linking such condensation products with certain functional reactants, mainly of an inorganic nature, which are capable of reacting with the free hydroxyls on the aromatic hydroxy groups in the same or different, e.g. adjacent, polymeric chains of such condensation product, to cross-link such chains and produce a novel class of valuable polymeric substances.

A still further object of the invention is to provide a class of polymeric substances produced by reacting condensation products of cyclic phosphonitrilic chloride polymers, preferably the trimer or tetramer, or mixtures thereof, and preferably substantially free of linear polymers of phosphonitrilic chloride, and polyhydroxy aromatic compounds, with certain cross-linking agents characterized by their ability to react with the free hydroxyls of the aromatic hydroxy groups on the same or different, e.g. adjacent, polymeric chains of said condensation products, to form cross-linked polymeric materials which are tough and have high heat stability.

Yet another object is the provision of procedure for producing the aforementioned novel polymeric materials.

A still further object is the provision of novel laminates and molding compositions employing said condensation products and said cross-linking agents.

Other objects and advantages of the invention will be apparent hereinafter.

We have found that a large class of particularly useful and versatile polymeric materials can be formed by reacting (1) a condensation product of a cyclic phosphonitrilic chloride, particularly the lower cyclics, e.g. trimeric or tetrameric phosphonitrilic chloride, and a polyhydroxy aromatic compound such as hydroquinone, with (2) a cross-linking agent derived from an inorganic acid, said cross-linking agent having two or more functional groups reactive with the free hydroxyls of the aromatic hydroxy groups on polymeric chains of the above condensation product, to thereby cross-link said chains through the resulting residues of said cross-linking agent. The residues of said cross-linking agent are thus believed to be linked directly to the oxygen atoms of the resulting dehydrogenated free hydroxyls on the polymeric chains of the condensation product. Such cross-linking can take place between aromatic hydroxy groups on the same polymeric chain of said condensation product or between aromatic hydroxy groups on different or adjacent chains of said condensation product.

The resulting cured cross-linked products have enhanced toughness, stability and inertness toward chemicals or to chemical attack, as compared, for example, to the simple heat cured forms of said condensation products, of cyclic phosphonitrilic chloride and polyhydroxy aromatic compounds.

Examples of cross-linking agents which can be employed according to the invention include inorganic polybasic acids, polyesters of inorganic polybasic acids, and acid halides of inorganic polybasic acids, particularly polyacid chlorides thereof. Such cross-linking agents each have a plurality of two or more reactive groups capable of reacting with at least two free hydroxyls of the aromatic or phenolic hydroxy groups on the same or different chains of the above noted condensation product of a cyclic phosphonitrilic chloride polymer and a polyhydroxy aromatic compound.

The condensation products or reactants (1) above employed in producing the cross-linked polymeric products of the invention are preferably obtained as described in the above copending applications of Rice and Riley, by reacting under certain reaction conditions a lower cyclic phosphonitrilic chloride with a polyhydroxy aromatic compound having two or more hydroxy groups, such as hydroquinone, tetrachlorohydroquinone, bisphenol - A, phloroglucinol, pyrogallol, catechol, resorcinol, toluhydroquinone, diphenolic acid, 1,4-dihydroxynaphthalene, and the 1,5-, 1,6- and 1,8-isomers thereof, trihydroxynaphthalenes and the like. The preferred polyhydroxy aromatic compounds are hydroquinone and resorcinol. These condensation products are referred to as "Component (1)" hereinafter.

The cyclic phosphonitrilic chloride materials employed in producing component (1), also referred to herein as the lower cyclics, are preferably cyclic trimeric or tetrameric phosphonitrilic chloride or mixtures thereof, e.g., a mixture of about 75% trimer and 25% tetramer by weight, substantially free of linear phosphonitrilic chloride polymers, but may contain minor amounts of higher cyclics, for example pentamer, hexamer and heptamer, totaling less than about 10% by weight of the total cyclics.

The condensation reaction for producing component (1) is preferably carried out in the presence of a tertiary amine functioning to form with the HCl produced in the reaction a salt of such amine, herein referred to as the HCl acceptor, and also in the presence of a catalytic tertiary amine functioning to facilitate removal of the chlorine atoms from the phosphonitrilic chloride starting material. The catalytic tertiary amine may also act as the HCl acceptor. Examples of the tertiary amines found particularly useful as HCl acceptors include heterocyclic tertiary amines, of which pyridine has been found particularly useful. Alternatively, aliphatic tertiary amines, such as tributylamine can also be employed as HCl acceptors. The tertiary amine employed also may constitute the reaction solvent as hereinafter pointed out.

The reaction is also carried out preferably in a solvent medium. Such solvent can be a homogeneous solvent in which the reactants and the HCl acceptor are all soluble, or a heterogeneous solvent in which the phosphonitrilic chloride and the HCl acceptor are soluble but in which the polyhydroxy aromatic compound, for example hydroquinone, is insoluble. Examples of homogeneous solvents include ethers such as dioxane, lower aliphatic nitriles such as acetonitrile, and aliphatic alcohol esters of the lower aliphatic acids such as ethyl acetate. Tertiary amines such as those noted above as HCl acceptors can also function as homogeneous solvents. Examples of heterogeneous solvents include aliphatic and aromatic hydrocarbons and chlorinated hydrocarbons such as heptane, toluene, carbon tetrachloride and chlorobenzene.

In preferred practice the amount of polydroxy aromatic material employed is at least 2 mols per mol of $PNCl_2$ moiety in the polyphosphonitrilic chloride, and the amount of HCl acceptor employed is sufficient to react with the HCl formed in the reaction, preferably employing in excess of 2 mols per mol of $PNCl_2$ moiety in the polyphosphonitrilic chloride.

The reaction is a substitution reaction in which most or all of the chlorine atoms of the polyphosphonitrilic chloride are replaced by residues of the polyhydroxy aromatic compound, and the reaction takes place under conditions including temperature such that the PN-containing rings of the phosphonitrilic chloride starting material are preserved in the final product. The condensation product is in the form of chains containing recurring cyclic, e.g., trimer and/or tetramer PN-containing ring nuclei or rings. The hydrogen atom of at least one of the functional hydroxy groups of the polyhydroxy aromatic compound is removed during the reaction. One or more phosphorus atoms in each PN-containing ring are linked to adjacent phosphorus atoms in adjacent PN ring nuclei through aromatic dioxy, e.g., phenylenedioxy, residue units formed by removal of the hydrogen atom of two hydroxy groups of the polyhydroxy aromatic compound. However, some of the polyhydroxy aromatic, e.g. benzenediol, residues are only partially reacted through one of the two functional hydroxy groups, the remaining hydroxy group being free and unreacted, forming aromatic oxy radicals containing free hydroxyl groups, e.g., hydroxyphenoxy radicals.

Following the reaction, the solvent is removed, e.g., by decantation, and the condensation product is precipitated and separated fromb the tertiary amine, tertiary amine hydrochloride and any excess polyhydroxy aromatic compound present by treatment with water, or by the "drowning" procedure described in U.S. application Ser. No. 37,466 of Lloyd A. Kaplan, filed June 20, 1960, and now abandoned, to recover the condensation product, substantially free of the above materials.

The constitutional formula of the above condensation products, component (1), depending on the degree of the condensation reaction, may be represented as follows:

(I)
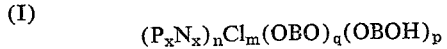

and preferably (Ia)
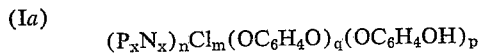

where B is a divalent aromatic radical, and including divalent aromatic radicals which may or may not contain one or more free hydroxyl groups, $P_xN_x$ is a cyclic PN ring residue, for example, a trimer or a tetramer ring

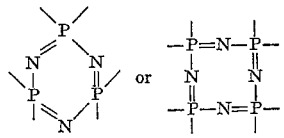

where $x$ is an integer in the range of 3 to 11, suitably in the range 3 to 5, $n$ is an integer of 2 or more representing the number of rings linked together by arylenedioxy, e.g., phenylenedioxy units, $m$ represents the number of chlorine atoms per mol of condensation product not removed in the dehydrohalogenation reaction, which may be as low as 0 and as high as about 60, but usually at least about 0.5. Chlorine may be present in the condensation product in an amount from 0 to 10%, usually about 0.1 to about 10% and preferably about 0.1 to about 5%, by weight of the product, $p$ is an integer equal to the number of hydroxyaryloxy, e.g., hydroxyphenoxy, groups per mol present in the product, which is at least 1, and may be as high as 120, preferably about 10 to about 75, such that the hydroxyl content may be as low as about 1% and as high as about 20% by weight of the condensation product. Where dihydroxy aromatic compounds are employed such as hydroquinone, the hydroxyl content of the condensation product can be up to about 12%, usually from about 3 to about 10%, by weight of the product, And $q$ is equal to $nx - \frac{1}{2}(m+p)$, and may be less than or greater than 1, usually at least 1.

Thus, $$2nx = 2q + m + p$$

The above reactions do not give a single compound, but rather a spectrum of compounds of different molecular weights in which $x$ may vary as noted above, and $n$, $m$, $p$, and $q$ may vary over a substantially wide range, and the products are mixtures of such compounds of varying chain lengths and geometries containing PN rings. The condensation product is thus an average of all of these compounds and the molecular weight, chlorine content, and OH group content as herein referred to, are the averages of all of the components of the mixture forming the product to which the above values are applied.

In the above condensation products comprising a mixture of compounds as above noted, there is present at least one, i.e., one or more linkages of the type II
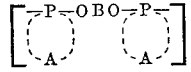

and preferably of the type

III
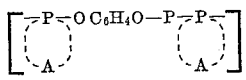

where B is a divalent aromatic radical, and including divalent aromatic radicals which may or may not contain one or more free hydroxyl groups, and where A represents the atoms necessary to complete a PN ring moiety, preferably a lower cyclic PN ring moiety such as a trimeric or tetrameric PN ring as above shown, and wherein said compounds of the mixture contain substituents on the phosphorus taken from the group consisting of —Cl and —BOH (preferably —$C_6H_4OH$) groups, where B has the value noted above.

The condensation products may have molecular weights of about 1,000 to about 20,000, usually about 3,000 to about 8,000, based on the average molecular weight as determined by vapor pressure osmometry, in accordance with the procedure described by A. P. Brady, H. Huff and J. W. McBain in "Journal of Physical and Colloid Chemistry," vol. 55, page 304 (1951).

Infrared absorption spectra obtained on the condensation product of, for example, hydroquinone and $(PNCl_2)_3$ or mixtures thereof with higher cyclics as starting material, show very strong absorption in the region of 11 to 11.5 microns, with a very strong absorption maximum at about 11.3 microns, characterizing the presence of the $P_3N_3$ ring in the product. Infrared absorption maxima at about 3.0 microns indicating the presence of hydroxyl groups, and at 10.5 microns, indicating the P—O—C aromatic linkage, are also obtained.

The entire description of the process for producing such condensation products and the products thus produced, as described in the above Rice, Riley applications, is incorporated herein by reference.

The polymeric cross-linked products of the invention may be represented by the formula:

(IV)

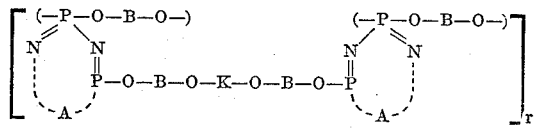

where A represents the atoms necessary to complete a cyclic PN ring, and particularly a member of the group consisting of $P_3N_3$ and $P_4N_4$ rings, B is a divalent aromatic radical such as, for example, phenylene or naphthalene, and including divalent aromatic radicals which may or may not contain one or more free hydroxyl groups, K is the divalent condensed radical of a cross-linking agent of the group consisting of inorganic polybasic acids, polyesters of inorganic polybasic acids, and acid halides of polybasic inorganic acids, such agents being reactive with the free hydroxyls of aromatic hydroxy groups, and r is an integer of at least 1, usually more than 1, e.g. up to as high as 500 or more. Such polymeric products usually, although not necessarily, also contain some chlorine attached to the phosphorus atoms, as described above, and may also contain some free hydroxyl groups.

Further, it will be recognized that where cross-linking agents having more than two functional groups are employed, such as silicon tetrachloride, there may be additional cross-linking between the second, third and fourth polyfunctional groups of the cross-linking agent, and component (1) in addition to the cross-linking which takes place between the first and second polyfunctional groups of the cross-linking agent and component (1), which is illustrated, for example, in Formula IV.

Examples of polybasic inorganic acids suitable as cross-linking agents for component (1) according to the invention include, for example, boric acid and phosphoric acid. In addition, substituted polybasic inorganic acids represented by the formula $RP(O)(OH)_2$ where R is aliphatic or aromatic, e.g. phenyl phosphonic acid,

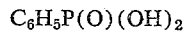

or ethyl phosphonic acid, may serve as cross-linking agents.

Examples of polyesters of the aforementioned polybasic inorganic acids which can also be employed as cross-linking agents for component (1) according to the invention, are the methyl and ethyl esters of boric and phosphoric acids, organic silicates and silanes such as tetraethyl orthosilicate, $Si(OC_2H_5)_4$, diethoxydiphenyl silane, $(C_6H_5)_2Si(OC_2H_5)_2$, and the like.

Various types of metallic and non-metallic halides or polyhalides, herein referred to generally as acid halides of inorganic polybasic acids, also can be employed as cross-linking agent according to the invention. These are preferably polyhalogen compounds, or polyacid halides of such polybasic acids, one such type being represented by the formula $MX_y$, where M is a metal or non-metal having a valence of at least 2, e.g. phosphorus, boron, silicon, tin, iron, antimony, arsenic, X is a halogen such as chlorine or bromine, and y is an integer of from 2 to 6. Examples of such cross-linking agents include phosphorus trichloride and pentachloride, phosphorus tribromide, boron trichloride and antimony pentachloride.

Substituted or complex metallic and non-metallic halides or polyhalides also can be used as cross-linking agents for component (1). Examples of suitable compounds of this type which can be employed have the general formula $M'Z_tX_s$, where M' is a metal or non-metal such as phosphorus, boron, carbon, silicon, tin; Z is alkyl, aryl, e.g. methyl, ethyl, phenyl, or oxygen, sulfur or nitrogen; X is a halogen such as chlorine or bromine, t is an integer generally from 1 to 3, and s is an integer of at least 2, generally 2 to 6. Examples of such compounds are polyphosphonitrilic chlorides,

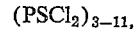

above described, phosgene, $COCl_2$, substituted boron dichlorides such as phenyl boron dichloride or ethyl boron dichloride, phosphorus oxychloride ($POCl_3$), dibutyl tin dichloride, thiophosphoryl chloride ($SPCl_3$), dichlorodiphenylsilane, $(C_6H_5)_2SiCl_2$, and substituted compounds represented by the formula $R(O)PCl_2$, where R is aliphatic or aromatic, e.g., phenylphosphonic dichloride, $C_6H_5(O)PCl_2$, and the like.

The reaction between component (1) and the above described polybasic acid, polyester, or acid halide cross-linking agent can be carried out by forming a solution or dispersion of component (1), e.g., the condensation product of trimeric and/or tetrameric phosphonitrilic chloride and hydroquinone, and the cross-linking agent employed, in an organic solvent. The reaction mixture can then be heated to reflux for a period of time and the reaction product recovered, e.g., by heating the reaction mixture to distill or evaporate off the solvent. Solvents which can be employed for this purpose include, for example, ketones such as acetone, methyl ethyl ketone, or methyl isobutyl ketone, alcohols such as ethanol, isopropanol and butanol, and esters such as ethyl and isopropyl acetates, the solvent chosen for any particular reaction being nonreactive with component (1) and also non-reactive with the particular cross-linking agent. Where the reaction results in the splitting off of HCl, as in reacting component (1), with an acid halide, as above described, a tertiary amine as described above and employed in the reaction for producing component (1), such as pyridine, is employed to facilitate the reaction. The reaction product recovered can be heated further at elevated temperature, if necessary, to complete the cross-linking reaction. The reaction product is preferably heated to temperatures ranging from about 250° to about 450° F., usually for a period of time, e.g., from about 15 minutes to about six hours, to effect a completion of the cross-linking reaction.

The above procedure for carrying out the reaction is useful where it is desired to employ the polymeric reaction product in the form of a coating, an adhesive or as a bonding layer. For these purposes the solvent solution of the reactants, which may contain, for example, from as little as 5, to as high as about 75% solids, is applied to the surface of a material which is to be coated, and the solvent evaporated to leave a coating or film which can then be subjected to elevated temperature as described above to complete the cross-linking reaction.

Alternatively, a mixture of component (1) and particularly the above described polybasic acid, polyester, or acid halide cross-linking agent can be prepared in the absence of solvent, and such mixture heated to produce the polymeric reaction product.

The amount of cross-linking agent employed in relation to component (1) can vary considerably, depending upon the hydroxyl content of component (1), the type of cross-linking agent employed, and the type of polymeric reaction product desired. In preferred practice a sufficient amount of polyfunctional cross-linking agent is added such that substantially all of the free hydroxyl groups on comoponent (1) can react and be fully cross-linked. However, a lesser degree of cross-linking can be obtained by employing an amount of cross-linking agent such that the stoichiometric ratio of groups thereof reactive with the hydroxyl groups of component (1) is less than 1:1. For example, from as little as about 1% to as much as 200%, or more, of cross-linking agent according to the invention can be employed, by weight of component (1).

If desired, the cross-linking agents according to the invention can be employed together with other cross-linking agents for reaction with component (1), such as the inorganic oxides or the salts of inorganic oxygen-containing acids described in the application of Rice and Geib, Ser. No. 221,937, filed Sept. 4, 1962, for example, a mixture of tetraethyl orthosilicate and magnesium oxide, or tetraethyl orthosilicate and silica. Further, a cross-linking agent according to the invention, together with a cross-linking agent of the type described in the application of Rice and Riley, Ser. No. 221,938, filed Sept. 4, 1962, e.g., a polybasic organic acid, such as azelaic acid, a polyepoxide such as dicyclopentadiene diepoxide, or an aldehyde such as formaldehyde (derived from hexamethylene tetramine), can be employed for reaction with component (1).

In addition to their above mentioned used in coatings and adhesives, the polymeric reaction products also have other uses, e.g., as bonding materials for production of laminates, in molding compositions, sealants and fireproofing materials. When employed in producing laminates, an organic solvent solution of compont (1) and the cross-linking agent can be prepared, a material to be laminated such as fiberglass cloth is dipped into the solution, and the so coated material is heated to temperature sufficient to evaporate most of the solvent and also to produce partial reaction or cross-linking. Several plies of this material are then laid up, and subjected to high pressure and heat in a laminating press to temperatures of the order of about 500° F. to complete the cross-linking and curing, to form the laminate, which is then removed from the press. When employed in molding compositions, the mixture of component (1) and cross-linking agent can be ground and the mixture placed in a mold and heated under pressure to an elevated temperature of the order of about 500° F., for a period sufficient to effect the cross-linking reaction. The molded polymeric material is then removed from the press.

Molding compositions according to the invention, can contain, for example, from about 60 to about 98% of component (1) and about 2 to about 40% of the cross-linking agent, e.g., tetraethyl orthosilicate, by weight of the composition. Molding compositions including component (1) and a combination of cross-linking agents such as a tetraethyl orthosilicate and an inorganic oxide, e.g., magnesium oxide or silica, have been found to be particularly advantageous. Such molding compositions are described and claimed in the above co-pending application Ser. No. 221,937 of Rice and Geib. Molding compositions including for example tetraethyl orthosilicate and an additional cross-linking agent of the type described in the above co-pending application of Rice and Riley, Ser. No. 221,938, e.g., dicyclopentadiene diepoxide, can also be provided. Such molding compositions, including a mixture of cross-linking agents, can contain, for example, about 60% to about 96% of component (1), about 2% to about 30% of cross-linking agent according to the invention, e.g., tetraethyl orthosilicate, and about 2% to about 30% of the additional cross-linking agent, e.g., magnesium oxide or dicyclopentadiene diepoxide by weight of the composition, the total being 100%. If desired, small amounts of other materials, such as fillers, can be included in the molding composition.

The polymeric cross-linked products of component (1) and cross-linking agents, according to the invention, have properties as described above which are superior generally to the properties of the unmodified cured component (1) itself, that is, component (1) heated to elevated temperature in the absence of any cross-linking agent. With respect to the cross-linked polymeric products of the invention, it will be noted that following the usual curing at temperatures aboves noted, if desired, a post cure can be effected by heating to higher temperatures, e.g., up to about 500° F.

A convenient method by which to prove that cross-linking of component (1) has or has not occurred lies in the fact that films of such condensation product itself, cast from polar solvents such as acetone, butanol, methyl ethyl ketone, etc., remain acetone-soluble when heated at temperatures less than 425° F. for certain periods of time; whereas such condensation products which are cross-linked produce films, when cast from the above solvents, which, when heated under the same conditions, become insoluble in acetone.

That is, a film of component (1) alone, prepared as described in the applications of Rice and Riley listed above, and cast from butanol, air-dried 64 hours at ambient temperature to remove solvent, then heated four hours 212° F. and two hours at 356° F., was dissolved when placed in acetone. In addition, the original condensation product could be recovered by evaporation of the acetone. Therefore, no reaction or curing of the condensation product has occurred during this treatment.

By contrast, acetone, butanol, or methyl ethyl ketone solutions of component (1) to which had been added amounts of cross-linking materials as described above, produced films which, when air-dried 64 hours at ambient temperature, then heated two hours at 200° F., and two hours at 275° F., provided films which now were not affected by immersion in acetone. This proves cross-linking of the component (1) comprising, for example, the $PNCl_2$-hydroquinone condensation products.

Condensation products of the trimer-tetramer mixture of phosphonitrilic chloride in a weight proportion of about 3 parts of the trimeric to 1 part of the tetrameric form and the polyhydroxy aromatic compounds listed in the table below were employed as component (1) in carrying out the cross-linking reactions of the examples below.

TABLE I

| Polyhydroxy aromatic compound: | Component (1) condensation product designation |
|---|---|
| Hydroquinone | Component (1-a) |
| Resorcinol | Component (1-b) |
| Bisphenol-A | Component (1-c) |

Component (1-a) of Table I above, prepared employing hydroquinone and a mixture of trimeric and tetrameric phosphonitrilic chloride, was prepared as follows:

A reaction flask was charged with 500 grams of a mixture of trimeric and tetrameric phosphonitrilic chlorides containing about 75% trimer and about 25% tetramer by weight, 1188 grams of hydroquinone and 7.5 liters of carbon tetrachloride. This mixture was stirred and heated to reflux and then 854 grams of anhydrous pyridine were added, and refluxing and stirring were continued for a period of about 6 hours. When cool, the carbon tetrachloride was removed by decantation, leaving about 2200 ml. of thick greenish-yellow oil which was a mixture of the condensation product of phosphonitrilic chloride and hydroquinone, with impurities. This oil was dissolved in 2 liters of a solution consisting of 80% by volume of acetic acid and 20% by volume of water, and the oil-solvent solution introduced in streams into a relatively large volume of flowing water under conditions to precipitate the condensation product of phosphonitrilic chloride and hydroquinone in the form of a flocculent solid, which was filtered out of the mixture and dried. This purification and isolation procedure for the cyclic phosphonitrilic chloride-hydroquinone condensation product is described in the co-pending application of Lloyd A. Kaplan, Ser. No. 37,466, filed June 20, 1960 and now abandoned.

Components (1-b) and (1-c) of Table I were each prepared by substantially the same procedure as described above, using equivalent amounts of resorcinol and bisphenol-A, respectively, in place of hydroquinone.

*Example 1*

A solution of 28 g. of component (1-a) in 65 g. of butanol was prepared, and 7 g. of tetraethyl orthosilicate was added to the solution. A film of the resulting solution was then cast and air dried 64 hours at ambient temperature to remove remaining solvent. The dried film was then heated 4 hours at 212° F. and then 2 hours at 356° F. The resulting cured film, when immersed in acetone, remained insoluble therein. A similar film prepared from component (1–a) without the addition of tetraethyl orthosilicate was soluble in acetone.

Example 2

The procedure of Example 1 is repeated, employing in place of component (1–a), the same amount of component (1–b) and the same amount of component (1–c), respectively. A film having properties similar to that formed in Example 1 and insoluble in acetone may be obtained in each case.

Example 3

To a solution at 70° C. of 100 ml. of ethyl acetate, 45 g. of component (1–a) and 12 g. of dibutyl tin dichloride, was added 4.0 g. of pyridine. The solution was heated to gentle reflux and an additional 2.5 g. of pyridine was added and the mixture refluxed an additional 3.5 hours, during which time a viscous oil formed. The solvent was decanted, the oil dissolved in 250 ml. of 80% acetic acid and the solution poured slowly into a large excess of rapidly stirred water. The filtered and dried solid weighed 31 g. and had a tin analysis of 10.05%.

Example 4

The procedure of Example 3 is substantially followed, except that instead of using dibutyl tin dichloride as cross-linking agent, 5 g. of gaseous boron trichloride is added slowly prior to refluxing.

Example 5

The procedure of Example 3 is substantially followed, except that instead of using dibutyl tin dichloride as cross-linking agent, 5 g. of phosphorus oxychloride is used. Results similar to those of Example 3 are obtainable.

Example 6

The procedure of Example 3 is substantially followed, except that instead of using dibutyl tin dichloride as cross-linking agent, 5 g. of boric acid is used.

Example 7

To a solution at 70° C. of 100 ml. of ethyl acetate, 45 g. of component (1–a) and 4.6 g. of a mixture of $PNCl_2$ trimer and tetramer (3:1) was added 4.0 g. of pyridine. The solution temperature rose spontaneously to reflux. The mixture was then refluxed 30 minutes during which time an oil formed. The solvent was decanted, the oil dissolved in 250 ml. 80% acetic acid, and the solution introduced slowly into a large excess of water. The resulting mixture was filtered, and the solid dried. The dried solid weighed 33 g.

Example 8

A solution of 25 g. of component (1–a) and 40 g. of diethoxydiphenylsilane in 90 ml. of dioxane was refluxed 7 hours, and the dioxane then removed by distillation. A rubbery condensation product remained in the pot which was dried in a vacuum to a dark brown glassy solid, soluble in methyl ethyl ketone and butanol.

Solutions of the condensation product in methyl ethyl ketone were used to form coatings on stainless steel panels.

Example 9

To a solution of 34 g. of component (1–a) in 60 ml. of methyl ethyl ketone was added slowly 9.6 g. of dichlorodiphenylsilane with vigorous stirring. Evolution of hydrogen chloride gas was quite noticeable. After about 1 hour, a considerable amount of solid had precipitated. This was filtered and dried, giving about 38 g. of solid product.

Example 10

A solution of 0.460 pound of the condensation product component (1–a), 1.172 pounds of butyl alcohol and 0.069 pound of tetraethyl orthosilicate was prepared. Fiberglass cloth was dip coated 5 times in this solution, air dried 18 hours, then dried 4 hours at 50° C. and 2 hours at 80° C. to allow the silicate to react partially with the condensation product.

Twelve plies of this cloth were laid up in a 6 x 6 inch press under about 24,000 pounds pressure. The temperature was raised gradually to 525° F., then the laminate was allowed to cool under pressure.

The laminate was tested at room temperature for flexural strength and modulus of elasticity giving the following results:

Flexural strength, p.s.i. _____ 51,740
Modulus of elasticity _____ 2,745,000

Example 11

A mixture of 97.7 g. of component (1–a) and 17.3 g. of tetraethyl orthosilicate was heated 18 hours at 50° C., then molded at 500° F. and 24,000 pounds pressure. A second mixture of 150 g. of the condensation product and 15.0 g. of tetraethyl orthosilicate was heated overnight at 50° C. then molded at 510° F. and 24,000 pounds pressure. Both moldings were glassy to clear amber.

Example 12

A mixture of 100 g. of component (1–a), 20 g. of dicyclopentadiene diepoxide and 20 g. of tetraethyl orthosilicate is heated 18 hours at 60° C., and then 2 hours at 120° C. This material is molded at 510° F. and 24,000 pounds pressure for 20 minutes, giving a clear amber molded specimen.

From the foregoing it is seen that the invention provides a novel class of cross-linked polymeric reaction products from the condensation products of cyclic phosphonitrilic chlorides with polyhydroxy aromatic compounds, particularly dihydroxy benzene compounds, having utility in various arts including coatings, adhesives, bonding and molding compositions.

While we have described particular embodiments of our invention for the purpose of illustration, it should be understood that various modifications and adaptations thereof may be made within the spirit of the invention, as set forth in the appended claims.

We claim:

1. A polymeric product consisting essentially of a condensation product in the form of a mixture of compounds, which mixture corresponds to a constitutional formula

where B is a divalent aromatic radical, $x$ is in the range of 3 to about 11, $n$ has a value of at least 2, $m$ ranges from 0 to about 60, $p$ is at least 1, and $q$ is related to $n$, $m$ and $p$ such that $$q = nx - \tfrac{1}{2}(m+p)$$

said mixture having a very strong infrared absorption in the region of about 11 to about 11.5 microns wave length, characteristic of the PN ring absorption region in the infrared absorption spectrum of trimeric polyphosphonitrilic chloride, reacted with a cross-linking agent of dibutyl tin dichloride.

2. A polymeric product consisting essentially of a condensation product in the form of a mixture of compounds, which mixture corresponds to a constitutional formula

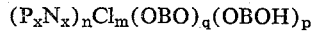

where B is a divalent aromatic radical, $x$ is in the range of 3 to about 11, $n$ has a value of at least 2, $m$ ranges from 0 to about 60, $p$ is at least 1, and $q$ is related to $n$, $m$ and $p$ such that $$q = nx - \tfrac{1}{2}(m+p)$$

said mixture having a very strong infrared absorption in the region to about 11 to 11.5 microns wave length, characteristic of the PN ring absorption region in the infrared absorption spectrum of trimeric polyphosphonitrilic chloride, reacted with a cross-linking agent of tetraethyl orthosilicate.

3. A molding composition comprising a mixture of
(a) a condensation product in the form of a mixture of compounds, which mixture corresponds to a constitutional formula $$(P_xN_x)_nCl_m(OBO)_q(OBOH)_p$$

where B is a divalent aromatic radical, $x$ is in the range of 3 to about 11, $n$ has a value of at least 2, $m$ ranges from 0 to about 60, $p$ is at least 1, and $q$ is related to $n$, $m$ and $p$ such that $$q = nx - \tfrac{1}{2}(m+p)$$

said mixture having a very strong infrared absorption in a region of about 11 to about 11.5 microns wave length, characteristic of the PN ring absorption region in the infrared absorption spectrum of trimeric polyphosphonitrilic chloride, and
(b) a cross-linking agent of tetraethyl orthosilicate.

4. A molding composition comprising a mixture of
(a) a condensation product in the form of a mixture of compounds, which mixture corresponds to a constitutional formula $$(P_xN_x)_nCl_m(OBO)_q(OBOH)_p$$

where B is a divalent aromatic radical, $x$ is in the range of 3 to about 11, $n$ has a value of at least 2, $m$ ranges from 0 to about 60, $p$ is at least 1, and $q$ is related to $n$, $m$ and $p$ such that $$q = nx - \tfrac{1}{2}(m+p)$$

said mixture having a very strong infrared absorption in a region of about 11 to about 11.5 microns wave length, characteristic of the PN ring absorption region in the infrared absorption spectrum of trimeric polyphosphonitrilic chloride, said molding composition being about 60% to about 98% by weight of said condensation product,
(b) a cross-linking agent of tetraethyl orthosilicate, and said molding composition being about 2% to about 40% by weight of said cross-linking agent.

References Cited by the Examiner
UNITED STATES PATENTS

| 2,866,773 | 12/1958 | Redfarn | 260—47 |
| 2,979,484 | 4/1961 | Redfarn | 260—51 |
| 3,121,704 | 2/1964 | Rice | 260—47 |
| 3,164,556 | 1/1965 | Apley | 260—2 |

SAMUEL H. BLECH, *Primary Examiner.*

WILLIAM H. SHORT, *Examiner.*

J. C. MARTIN, M. GOLDSTEIN, *Assistant Examiners.*